United States Patent [19]
Holinski

[11] 3,791,243
[45] Feb. 12, 1974

[54] METHOD AND APPARATUS FOR FORMING EDGES ON AN ENDLESS BELT

[75] Inventor: Thomas J. Holinski, Monroe, N.Y.

[73] Assignee: Xerox Corporation, Rochester, N.Y.

[22] Filed: May 8, 1972

[21] Appl. No.: 251,046

[52] U.S. Cl.................. 83/54, 83/180, 83/187, 83/925 EB
[51] Int. Cl.............................................. B26d 3/22
[58] Field of Search..... 83/180, 185, 186, 187, 924, 83/54, 925 EB

[56] References Cited
UNITED STATES PATENTS

| | | | |
|---|---|---|---|
| R5,903 | 6/1874 | Hull | 83/185 X |
| 2,484,854 | 10/1949 | Peters | 83/185 X |
| 2,588,647 | 3/1952 | Mitchell | 83/925 EB X |
| 2,749,983 | 6/1956 | Rogers | 83/185 X |
| 3,701,186 | 10/1972 | Kuts | 83/925 EB X |
| 3,576,147 | 4/1971 | Kerr, Jr. | 83/187 |

FOREIGN PATENTS OR APPLICATIONS 341,031  9/1921  Germany .............. 83/187

*Primary Examiner*—Frank T. Yost

[57] ABSTRACT

A well-defined edge is formed on an endless belt by positioning the belt on a generally cylindrically shaped mandrel with an inner surface thereof adjacent to a first stationary rotatably mounted cutter blade, advancing into engagement with an outer surface of the endless belt at a location oppositely disposed to the first cutter blade a second rotatably mounted cutter blade, rotating each of the cutter blades and rotating the mandrel through at least one revolution thereby forming a well-defined edge on the belt.

8 Claims, 7 Drawing Figures

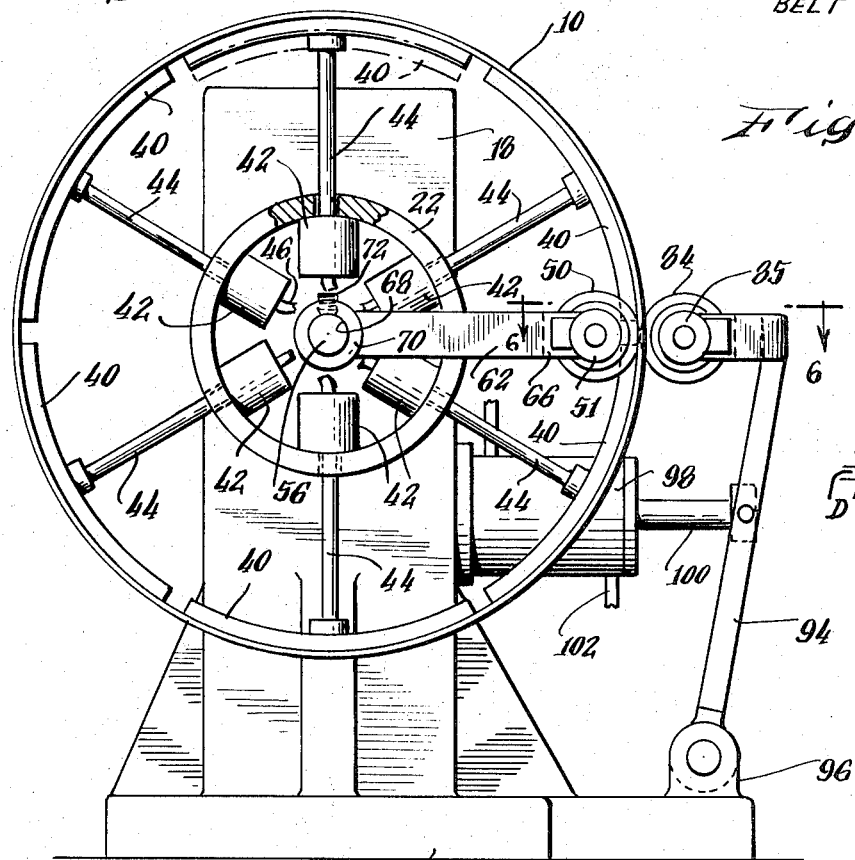
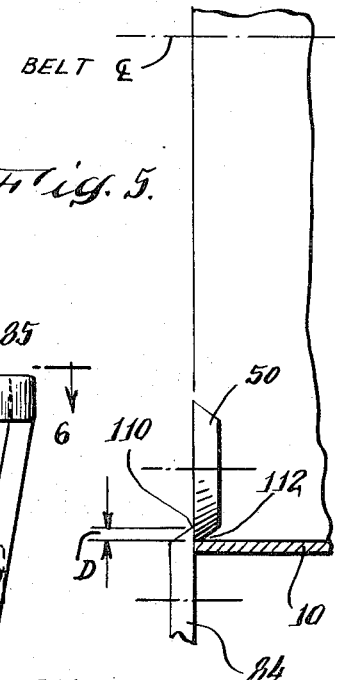
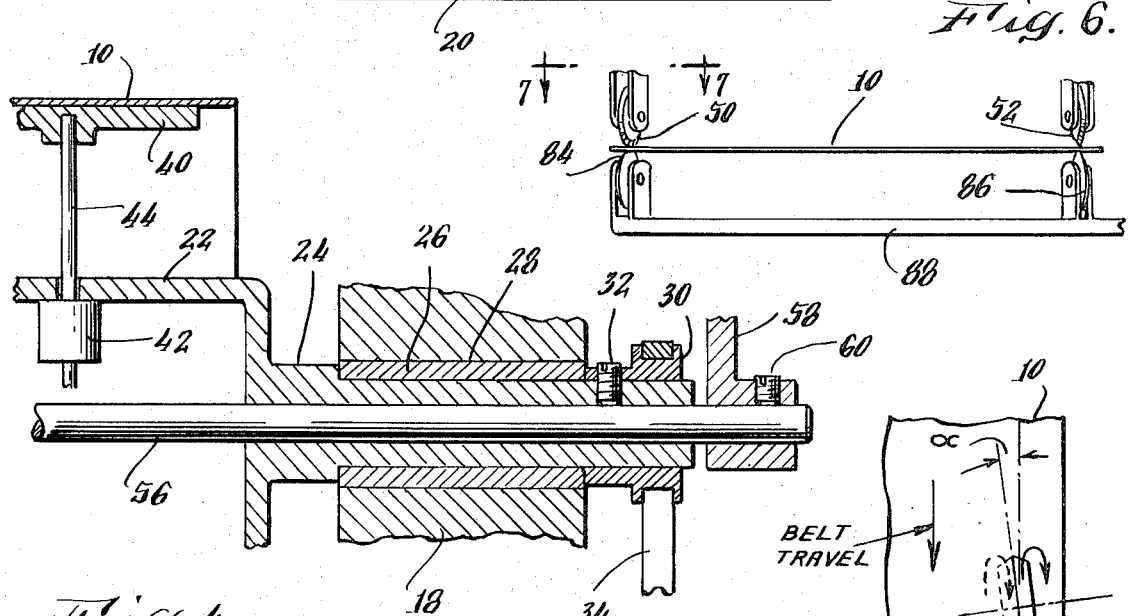
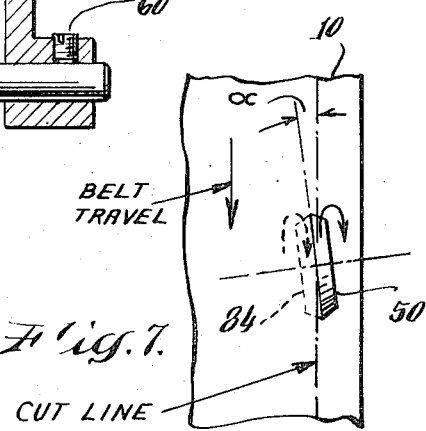

METHOD AND APPARATUS FOR FORMING EDGES ON AN ENDLESS BELT

This invention relates to a method and apparatus for shearing metal strips. The invention relates more particularly to a method and apparatus for providing well defined edges on relatively thin flexible endless belts.

There arises at times a requirement for establishing well-defined, substantially parallel edges on a relatively thin walled flexible endless belt. For example, in the field of electrostatographic reproduction, a form of electrostatographic image retention surface comprises a photoconductor material deposited on a support body substrate. One type of support body substrate comprises a relatively thin-walled, flexible, electrically conductive, seamless belt or band. The belt has a thickness for example on the order of about 0.003 to 0.010 inches and is generally formed of nickel or of brass. A typical belt is formed of nickel and has a nominal thickness of about 0.0045 inches, a diameter of about 20 inches and a width of about 16-½ inches. The belt can be formed by electrodepositing the nickel material on a surface of an accurately rounded and smoothed mandrel which is rotated in an electrolytic cell. After a sufficient amount of material has been deposited for forming a belt of desired thickness, the mandrel is withdrawn from the bath, cooled, and the belt is then removed from the mandrel. Endless belts formed in this manner generally exhibit irregular and non-uniform edges. Accordingly, in order to index and accommodate the belt on various utility apparatus, it is necessary that the edges of the belt be well-defined, be substantially parallel, and lie in a plane which is generally perpendicular to the axis of the belt.

In satisfying these requirements for a well-defined edge on a thin walled endless belt, it is necessary to trim the edges in a relatively accurate manner. It is further desirable to accomplish the trimming in a relatively economic manner and at a relatively high rate of production. It has been proposed to satisfy these needs by positioning the belt on a cylindrical support mandrel and by transporting a cutting blade in contact with the belt over a track extending about the circumference of the stationary belt. However, due to various eccentricities resulting in the manufacture, set up and wear of the mandrel, this technique generally results in the creating of a cutter blade track which does not return to its point of origination and introduces a toothed edge or step to the newly formed edge near the origin of the cut. Further, in order to provide a well-defined edge, the cutting blade must traverse a track about the circumference of the belt which is axially inward of the edge irregularity. This then requires that upon the initiation of the cutting step, the cutting blade initially pierce the belt. However, it is believed that the steps of both piercing and cutting will cause a deformation in the edge being created by causing a folding over of the newly formed edge with respect to the surface of the belt.

Accordinly, it is an object of this invention to provide an improved method and apparatus for forming a well-defined edge on an endless belt.

Another object of this invention is to provide an improved method and apparatus for forming a relatively thin walled metallic endless belt, a well-defined edge which lies in a plane substantially perpendicular to a longitudinal axis of the belt.

Another object of the invention is to provide a method and apparatus for forming on a relatively thin walled metallic, endless belt well-defined edges which are substantially parallel and each of which lie in a plane substantially perpendicular to a longitudinal axis of the belt.

Another object of the invention is to provide an improved method and apparatus for both piercing and cutting a well-defined edge on a relatively thin walled metallic endless belt.

A further object of the invention is to provide an improved method and apparatus for forming with cutter blade means a well-defined edge on a relatively thin walled flexible metallic endless belt wherein the cutting edge traverses a track about the circumference of the belt and the track returns substantially to its point of origination and avoids the creation of a step or tooth on the edge thus formed.

Another object of the invention is to provide an improved method and apparatus for forming a well-defined edge on a relatively thin walled flexible, metallic endless belt which avoids folding over and distortion of the edge thus created.

Another object of the invention is to provide an improved method and apparatus which effects positional stability of a relatively thin walled, flexible, metallic endless belt during an edge cutting operation.

In accordance with features of the invention, a well-defined edge is formed on an endless belt by positioning the belt on a generally cylindrically shaped mandrel with an inner surface thereof adjacent to a first stationary, rotatably mounted cutter blade, advancing into engagement with an outer surface of the endless belt at a location generally oppositely disposed to the first cutter blade a second rotatably mounted cutter blade and rotating the mandrel through at least one revolution thereby forming a well-defined edge on the belt. In accordance with other features of the invention, the second rotatably mounted cutter blade is advanced into engagement with the belt surface, pierces the thin walled belt and extends in overlapping relationship with respect to a cutting edge of the first cutting blade. In accordance with further features of th invention, first and second pairs of blades are spaced apart along the length of the belt for forming well-defined substantially parallel edges which lie in a plane normal to the axis of the belt.

These and other objects and features of the invention will become apparent with reference to the following specification and to the drawings wherein:

FIG. 3 is an enlarged front elevation view of the apparatus of FIG. 1;

FIG. 4 is a view taken along line 4—4 of FIG. 1;

FIG. 5 is an enlarged view of a portion of a pair of cutting knives utilized with the apparatus of FIG. 1;

FIG. 6 is a view taken along line 6—6 of FIG. 3; and

FIG. 7 is a view taken along line 7—7 of FIG. 6.

Figure 1:
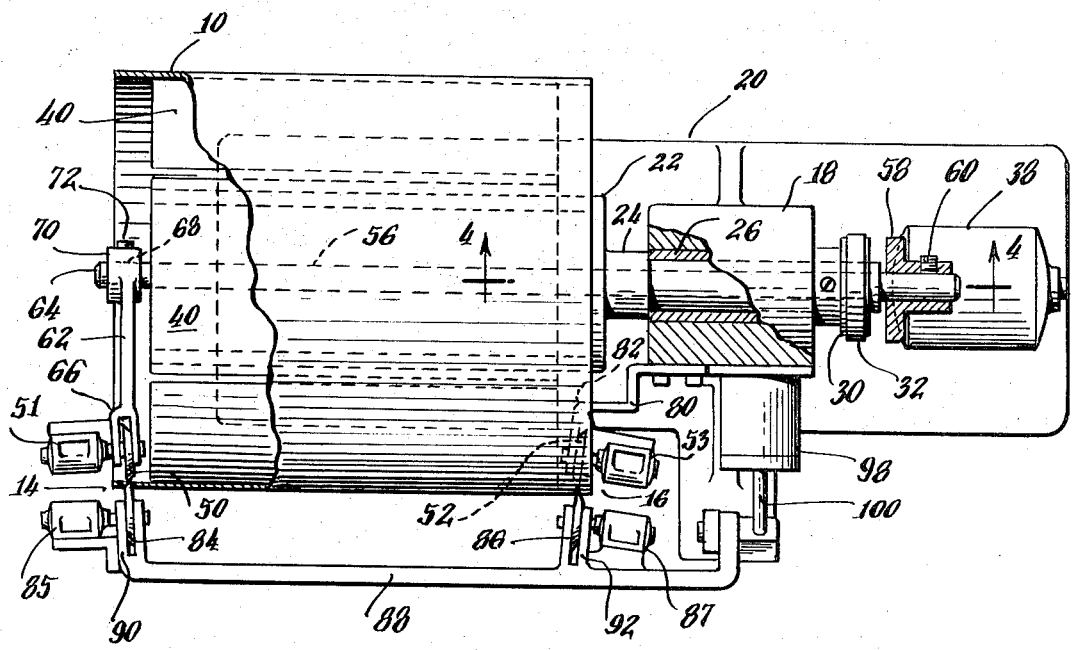
FIG. 1 is a plan view of an apparatus constructed in accordance with features of this invention.

Referring now to the drawings, a relatively thin walled, flexible, metallic endless belt 10 is positioned on a rotatably driven mandrel referenced generally as 12 and well-defined edges are formed thereon by a first pair 14 of stationary, circular rotating cutter blades positioned at a cutting station near one end of the mandrel and a second pair 16 of stationary circular rotating cutter blades positioned at a cutting station near an opposite end of the mandrel. The mandrel 12 is rotatably mounted from a vertical post 18 which is integral with and extends from a support base 20. A support frame for the mandrel includes a hollow cylindrically shaped segment 22 having integral therewith an axially extending tubular journal segment 24 which extends in bearing contact with a journal bearing 26 (FIG. 4). The journal bearing is fitted in a cylindrical bore 28 formed in the post 18. A drive pulley 30 is mounted near a distal portion of the journaled segment 24 and is secured to the journal by press fitting and by a set screw 32. A drive belt 34 extends between the drive pulley 30 and a motor drive pulley 36 which is mounted on a drive shaft of an electric motor 38. Energization of the electric motor 38 therefore causes rotation of the mandrel frame assembly.

The mandrel 12 is an expansible type of mandrel wherein an outer surface thereof is formed by a plurality of arcuate segments 40 which when aligned in a fully extended position define an accurate cylindrically shaped outer surface. The segments 40 are retractable from the fully extended position as shown in the drawings in order to provide sufficient clearance and to facilitate the positioning of the endless belt 10 on the mandrel. Extension and retraction of these segments is accomplished by pneumatic means which includes a plurality of piston and cylinder assemblies. A plurality of cylinders 42 are mounted to an inner surface of the frame 22. The cylinders are aligned with apertures formed in the frame and pistons 44 extend from the cylinders through the apertures and are secured to the arcuate segements 40 for positioning the segments at a predetermined, extended, radial location. A pneumatic pressure source, not illustrated, such as a source of compressed air is coupled to each of the pistons through inlet lines 46. This pneumatic arrangement includes means for applying the pneumatic pressure to different portions of an operating surface of the pneumatic piston in order to cause the piston to alternatively retract into, or, extend from an associated cylinder. Conventional pressurized rotatable unions which are employed for intercoupling the source of pressure and the rotating cylinders as well as the various pneumatic control means are not illustrated for purposes of simplification of the drawings.

Figure 2:
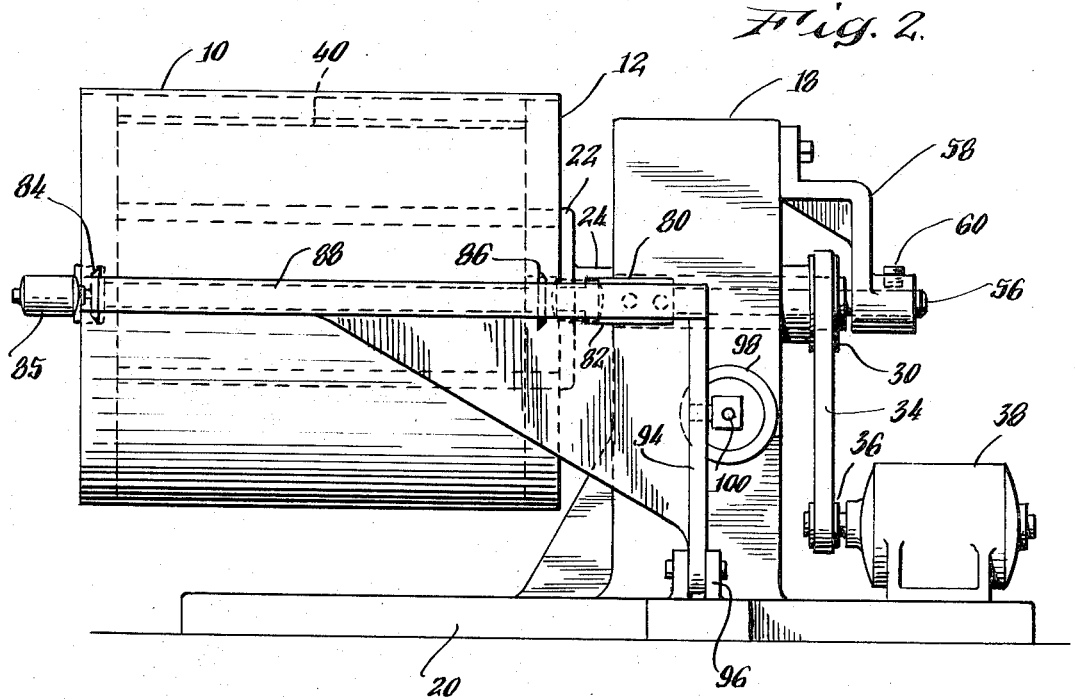
FIG. 2 is a side elevational view of the apparatus of FIG. 1.

The belt cutter pairs 14 and 16 are spaced apart and extend beyond the end portion of the mandrel. The cutter pairs 14 and 16 include circular blades 50 and 52 respectively which are mounted on and rotated with drive shafts of electric motors 51 and 53 respectively. Mounting of the motors and cutter blades is provided by means including a shaft 56 which extends through and beyond the length of the mandrel on the left as viewed in FIGS. 1 and 2 and extends through a bore in the tubular journaled segment 24 of the frame 22. The shaft extends beyond the drive pulley 30 of the mandrel and is restricted from rotating by an arm 58 which is secured to the shaft 56 by a set screw 60 and is bolted to the post 18. An extension arm 62 is secured to a distal end segment 64 of the stationary support rod 56 and includes a bifurcated segment 66 within which the cutter wheel 50 is positioned and rotatably mounted. The shaft 56 extends through a bore 68 in a hub 70 of the support arm 62. The arm 62 is rigidly mounted to the shaft 56 by a set screw 72 which extends radially through the bore and abuts the shaft 56. The length of the shaft 62 is selected for positioning an edge of the cutter blade 50 adjacent an inner surface of the drum 10 when the mandrel is extended.

The cutter blade 52 and drive motor 53 of the cutter pair 16 is mounted by an arm 80 which similarly includes a bifurcated segment 82 within which the blade 52 is positioned and rotatably secured. The arm 80 is dimensioned and mounted by screws to the post 18 at a position for providing that the extending cutting edge of the blade 52 is located for contacting an inner surface of the drum 10 when the mandrel is extended.

Cutter blades 84 and 86 of the cutter pair 14 and 16 respectively are each driven by electric motors 85 and 87. The motor and cutter blades are supported from an arm 88 which extends substantially parallel to the axis of the shaft 56. This arm includes bifurcated segments 90 and 92 within which the blades 84 and 86 respectively are positioned and rotatably mounted. In order to provide clearance for mounting of the endless belt 10 on the mandrel, a means is provided for retracting the arm 88 and the cutting blades 84 and 86 from the cutting station. This means includes an extending arm 94 which is pivotally mounted about a stationary base member 96. A pneumatic means is provided for effecting rotation of the arm 94 about the pivot point 96. This pneumatic means includes a horizontally aligned cylinder 98 which is mounted to the post 18 and a piston 100 is coupled to the arm 94. A pressure line 102 couples pneumatic pressure to the cylinder 98 for causing the piston 100 to extend from or withdraw into the cylinder thereby correspondingly causing the cutter blades 84 and 86 to withdraw from and advance toward the cutting station. Control of the operation of the cylinder 98 is provided by a pneumatic control means not illustrated, and a source of pneumatic pressure. When the mandrel 12 is stationary, the control means is adapted for automatically causing the pistons 44 of the mandrel to retract and the piston 100 to extend thereby freeing the belt and parting the cutting blades for facilitating removal of the belt.

It is desirable that the cutting edges of the cutter blades of each cutter pair travel at the same velocity in order to establish a well defined edge and to avoid dragging or tearing of the edges. When the circular cutter blades are of the same diameter, then the angular velocity of the blades and of the motor drive shafts should be equal. A suitable electrical drive arrangement comprises a conventional selsyn system wherein the motors 51, 53, 85 and 87 are excited by a generator, not illustrated. Supply leads to the motor 51 are dressed along the shaft 56 and support arm 62. Supply leads for the motor 85 are dressed along the arm 88. Alternatively, the cutter blades for each pair are cog belt driven from a same motor. In this latter arrangement means are provided for coupling the drive belt of cutter pair 14 in order to permit unobstructed mounting and demounting of the belt 10.

In operation, rotation of the mandrel is halted and the pneumatic piston-cylinder assemblies are actuated in order to cause the arcuate segments of the mandrel 40 to retract and the cutter blades 84 and 86 to withdraw from the cutting station. The belt is then positioned about the mandrel by the machine operator and the pneumatic control means is automatically operated or alternatively by the machine operator for causing the piston assemblies to expand the mandrel members and advance the cutting blades 84 and 86 to the cutting station. The mandrel segments 40 advance radially until restrained by the outer circumference of the belt thereby providing a predetermined force on the belt, which holds the belt firmly to the mandrel. Energization of the electric motor 38 and the motors is then provided for causing the mandrel to rotate through one revolution and effect edge trimming. The mandrel segments 40 are then automatically withdrawn and the cutting blades 84 and 86 are retracted from the cutting station in order to provide for removal of the edge trimmed belt 10 from the mandrel.

Through this method and apparatus, well-defined edges are formed on the belt 10. The arrangement is particularly advantageous in that the cutter pairs 14 and 16 cut edges which describe a path which returns to its point of origin and avoids the creation of a step or tooth at the starting point. This advantageous result will be provided even when eccentricities occur in the construction or set up of the machine or result from wear in its operation. This result could not be readily achieved, if at all, in arrangements wherein the cutting edges are transported about a stationary belt.

The method and apparatus thus described is further advantageous in that the cutter blades of a cutter pair pierce as well as cut a well-defined edge while avoiding flanging or distorting of the edge. This is accomplished by providing a slight overlap (FIG. 5) between cutting edges of the cutting blades of a cutter pair. More particularly, with respect to the cutter pair 14, the cutter blade 50 is positioned for effecting a slight and non-penetrating contact with the inner surface of the belt 10 when the belt is extended by the mandrel. As the cutter blade 84 is advanced to the cutter station, it pierces the belt 10 and progresses to a location at which its edge 110 extends beyond the edge 112 of the cutter blade 50. This overlap of the cutter edges has resulted in a relatively clean well-defined edge which is free from flanging and tearing. While various cutter blades may be employed in performing edge trimming in accordance with this invention and while the extent of this overlap will vary in accordance with the composition and thickness of the belt material, in one exemplary arrangement, each of the cutter blades comprises a 2 inches diameter, flat ground, disc blade formed of hardened tool steel, and an overlap D of 0.008 inches when cutting a nickel belt having a thickness of about 0.0045 inches is provided.

Positioning of the cutter blade pairs 14 and 16 in substantially perfect alignment with a plane which extends perpendicular to the axis of the belt can result in the application of forces to the belt which cause the belt to compact and twist between the cutter pairs thereby distorting the surface of the belt. In accordance with another feature of the invention, a tensioning force is established on the belt by canting the cutter blade pairs with respect to a plane 116 extending perpendicularly to an axis of the belt. This tensioning force eliminates the twisting and distorting of the belt surface which would occur when the cutter pairs are aligned in the plane 116 perpendicular to the axis of the belt. The canting need only be by a substantially small angle α as illustrated in FIG. 6. This angle is typically on the order to about 1° to 3°. For the purpose of the claims appended herein, the expression substantially perpendicular or normal to a longitudinal axis of the belt includes canting of the cutter pairs by an amount sufficient for providing a tensioning force for inhibiting twisting and distorting of the belt.

There has thus been described an improved method and apparatus for forming well-defined edges on a relatively thin walled, flexible, seamless endless belt. The method and apparatus are particularly advantageous in that they provide an edge which is formed by cutter blades which track a path about the circumference and return to the point of origination. The method and apparatus are further advantageous in that the cutter blades are adapted for intially piercing and then cutting the well-defined edges while avoiding the creation of flanges or distortions in the edge thus being formed. The invention further provides for the establishment of a tensioning force in an axial direction along the length of a belt thereby inhibiting twisting and distortion of the belt during the cutting operation.

While there has been described a particular process and apparatus for carrying out the invention, it will be understood that various modifications may be made thereto without departing from the spirit of the invention and the scope of the appended claims.

What is claimed is:

1. A method for forming a well-defined edge on a relatively thin walled endless belt comprising the steps of:
   mounting the endless belt on a rotatable support body;
   disposing said belt over one of a pair of rotatably mounted circular belt cutting blades;
   bringing a second one of said blade pair into cutting relationship with said first blade;
   canting said blade pair at a slight angle with respect to the direction of travel of said belt on said support to enhance formation of said edge; and
   rotating the support body for at least one revolution for causing the blades to follow a circumferential track about the belt which returns to a point of origin thereby establishing a well-defined edge for the belt.

2. The method of claim 1 including the step of disposing said belt over a second cutting blade pair canted at an angle with respect to the direction of travel of said belt at a point longitudinally spaced from the point where said first mentioned cutting blade pair contacts said belt thereby forming well-defined edges on each edge of said belt.

3. An apparatus for establishing well-defined edges on a relatively thin walled flexible endless belt comprising:
   a generally cylindrically shaped rotatably mounted support body for receiving and rotating an endless belt about an axis thereof;
   cooperating interior and exterior cutting means adapted to engage said belt therebetween at a cutting station of said apparatus, said interior cutting means being adapted on disposition of said belt in operative position on said support body to come into cutting engagement with the interior of said belt;
   means supporting said exterior cutting means for movement from an inoperative position permitting loading of said belt onto and off of said support body to an operative position in cutting engagement with said belt and said interior cutting means;
   drive means to move said exterior cutting means between said inoperative and operative positions; and means for rotating said support body whereby said cutting means cuts said belt to form an edge on said belt which traverses a track which returns to a point of origin.

4. The apparatus of claim 3 wherein said drive means advances said exterior cutting means by a distance sufficient to overlap said interior cutting means.

5. An apparatus for establishing well-defined edges on a relatively thin walled flexible endless belt comprising:
   a generally cylindrically shaped rotatably mounted support body for receiving and rotating an endless belt about an axis thereof;
   cutting means adapted to contact said belt at a cutting station of said apparatus;
   means for rotating said support body whereby said cutting means forms an edge on said belt which traverses a track which returns to a point of origin;
   said cutting means comprising first and second pairs of rotatably mounted circular cutter blades, said blade pairs being longitudinally spaced apart at locations along the width of said belt, one each of said blade pairs being rotatably mounted at a stationary cutting location and a second one of said blade pairs being advanced into said belt;
   means for rotating said blades;
   and a means for advancing at least one blade of each blade pair toward said belt for piercing said belt, said advancing means advancing said one blade by a distance sufficient to provide an overlap between the edges of said blades,
   each of said blade pair lying substantially in a same plane which is canted with respect to a plane extending perpendicular to the axis of said belt.

6. The apparatus of claim 5 wherein said plane of said blades is canted at an angle of between about 1° and 3° with respect to a plane normal to the axis of said belt.

7. An apparatus for establishing well-defined edges on a relatively thin walled flexible endless belt comprising:
   a generally cylindrically shaped rotatably mounted support body for receiving and rotating an endless belt about an axis thereof;
   cutting means adapted to contact said belt at a cutting station of said apparatus;
   means for rotating said support body whereby said cutting means forms an edge on said belt which traverses a track which returns to a point of origin;
   said cutting means comprising first and second pairs of rotatably mounted circular cutter blades, said blade pairs being longitudinally spaced apart at locations along the width of said belt, one each of said blade pairs being rotatably mounted at a stationary cutting location and a second one of said blade pairs being advanced into said belt;
   means for rotating said blades;
   and a means for advancing at least one blade of each blade pair toward said belt for piercing said belt, said advancing means advancing said one blade by a distance sufficient to provide an overlap between the edges of said blades,
   an axis of said cutting blades being canted in a vertical direction with respect to a horizontally extending axis of said belt.

8. An apparatus for establishing well-defined edges on a relatively thin walled flexible endless belt comprising:
   a generally cylindrically shaped rotatably mounted support body for receiving and rotating an endless belt about an axis thereof;
   cutting means adapted to contact said belt at a cutting station of said apparatus;
   means for rotating said support body whereby said cutting means forms an edge on said belt which traverses a track which returns to a point or origin,
   said cutting means comprising a pair of rotatably mounted circular cutting blades,
   means for rotating said blades,
   and a means for advancing at least one of said blades toward said belt for piercing said belt;
   said generally cylindrically shaped support body comprising an extensible mandrel having a plurality of arcuate shaped segments which are adapted to be expanded to form a cylindrically shaped support body for tensioning said belt and for cutting thereof and for retraction for removal of said belt of said mandrel.

* * * * *